(12) United States Patent  
Gutierrez et al.

(10) Patent No.: US 11,816,490 B2  
(45) Date of Patent: Nov. 14, 2023

(54) VLIW POWER MANAGEMENT

(71) Applicant: Advanced Micro Devices, Inc., Santa Clara, CA (US)

(72) Inventors: Anthony Thomas Gutierrez, Seattle, WA (US); Karthik Ramu Sangaiah, Seattle, WA (US); Vedula Venkata Srikant Bharadwaj, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 30 days.

(21) Appl. No.: 17/550,878

(22) Filed: Dec. 14, 2021

(65) Prior Publication Data

US 2023/0185575 A1 Jun. 15, 2023

(51) Int. Cl.
*G06F 9/38* (2018.01)
*G06F 1/18* (2006.01)
*G06F 9/30* (2018.01)

(52) U.S. Cl.
CPC ............ *G06F 9/3853* (2013.01); *G06F 1/189* (2013.01); *G06F 9/30145* (2013.01); *G06F 9/3885* (2013.01)

(58) Field of Classification Search
CPC .. G06F 9/3853; G06F 9/3885; G06F 9/30145; G06F 1/189
See application file for complete search history.

(56) References Cited

U.S. PATENT DOCUMENTS

2005/0229018 A1* 10/2005 De Oliveira Kastrup Pereira ...... G06F 9/3885  
712/E9.032

OTHER PUBLICATIONS

Xiao, Shu et al., "VLIW Instruction Scheduling for Minimal Power Variation", ACM Transactions on Architecture and Code Optimization, vol. 4, No. 3 [retrieved Oct. 14, 2021]. Retrieved from the Internet <https://doi.org/10.1145/1275937.1275942f>., Sep. 1, 2007, 31 Pages.

* cited by examiner

*Primary Examiner* — Zachary K Huson  
(74) *Attorney, Agent, or Firm* — FIG. 1 Patents

(57) ABSTRACT

VLIW directed Power Management is described. In accordance with described techniques, a program is compiled to generate instructions for execution by a very long instruction word machine. During the compiling, power configurations for the very long instruction word machine to execute the instructions are determined, and fields of the instructions are populated with the power configurations. In one or more implementations, an instruction that includes a power configuration for the very long instruction word machine and operations for execution by the very long instruction word machine is obtained. A power setting of the very long instruction word machine is adjusted based on the power configuration of the instruction, and the operations of the instruction are executed by the very long instruction word machine.

20 Claims, 5 Drawing Sheets

VLIW POWER MANAGEMENT

BACKGROUND

Very long instruction word (VLIW) machines execute operations of VLIW instructions concurrently based on a fixed schedule, which is determined when a program is compiled. In contrast to other processor architectures, such as those in which each instruction encodes a single operation, VLIW machines execute VLIW instructions which each encode multiple operations. Doing so allows multiple operations to execute concurrently in order to achieve the maximum utilization of processing power. Because each VLIW instruction includes multiple operations, VLIW instructions are "very long" in comparison to the instruction word size utilized by conventional processors. VLIW machines are deterministic and static and thus are able to schedule instructions and data movement operations without stalls. Due to their static nature, VLIW machines are highly effective and widely used as accelerators for domains such as digital signal processing, cryptography, machine learning, and more.

BRIEF DESCRIPTION OF THE DRAWINGS

The detailed description is described with reference to the accompanying figures.

DETAILED DESCRIPTION

Overview

Figure 1:
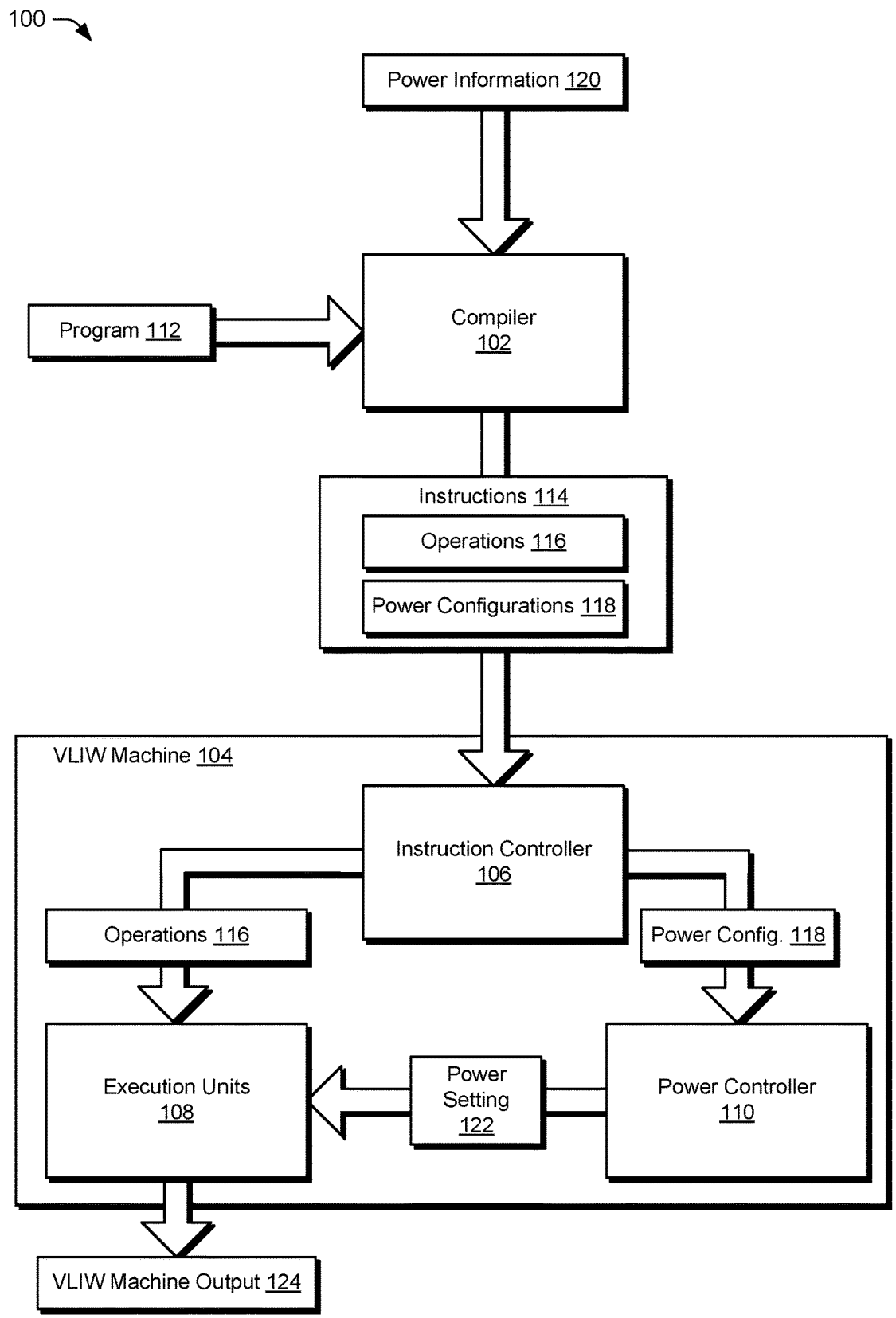
FIG. 1 is a block diagram of a non-limiting example system having a compiler and a VLIW machine according to some implementations.

Very long instruction word (VLIW) machines execute operations of VLIW instructions concurrently based on a fixed schedule, which is determined when a program is compiled. Each VLIW instruction includes a number of operation fields which corresponds to the number of execution units of the VLIW machine for which the instruction is compiled. Thus, VLIW machines having different numbers of execution units execute VLIW instructions having a corresponding number of operation fields. VLIW instructions containing multiple fields which are executable by VLIW machines are referred to herein as "instructions."

VLIW machines often experience phasic power behavior, which are periods of higher and lower power consumption. This occurs because the programmability of some VLIW machines enables fields of the instructions to target differing execution units. However, those different operations when executed by the execution units, can consume differing amounts of power. For example, a single field of an instruction can target an addition operation which consumes a low amount of power or a multiplication operation which consumes a higher amount of power. In this example, a higher amount of power will be consumed by the VLIW machine when the instructions include a high frequency of multiplication operations with a low frequency of addition operations whereas a lower amount of power will be consumed by the VLIW machine when the instructions include a high frequency of addition operations with a low frequency of multiplication operations. Thus, the power consumption of VLIW machines varies based on the power requirements of the different execution units as well as the specific operations which are included in each instruction. This variance in power consumption to execute different operations included in the instructions causes conventional VLIW machines to waste power since they are unable to dynamically adjust their power settings to closely match the power used by the VLIW machine to execute different instructions or blocks of instructions.

To solve these problems, the techniques described herein determine a power configuration for the VLIW machine to execute a particular instruction or block of instructions prior to execution of the instructions by the VLIW machine. The power configurations are then populated into fields of the instructions in order to direct the VLIW machine to dynamically adjust power settings of the VLIW machine during execution of the instructions. In this way, the power setting of the VLIW machine is increased or decreased dynamically, as instructions are executed, based on the estimated amount of power that will be used by the VLIW machine to execute different instructions or blocks of instructions.

In one or more implementations, the power configuration for the VLIW machine is determined by a compiler while the instructions are being compiled. Directing the power setting of the VLIW machine from the compiler optimizes the efficiency of the VLIW machine because the compiler is able to determine high quality power estimates for both individual instructions as well as large blocks of instructions in order to explicitly manage the power configuration of the VLIW machine with very low cost. Moreover, the ability for the compiler to direct the power configuration of the VLIW machine reduces the need for complex hardware components, which are often utilized by conventional VLIW machines, in order to predict a program's power profile or adjust power settings based on recent power consumption.

Notably, conventionally configured compilers are limited to compiling instructions for VLIW machines by populating fields of those instructions with operations, but those compilers do not populate fields of instructions for VLIW machines with a power configuration. Thus, conventional VLIW instructions are unable to manage the power consumption of the VLIW machine by directing the VLIW machine to dynamically vary the power settings while executing the instructions.

In some aspects, the techniques described herein relate to a method including: compiling a program to generate instructions for execution by a very long instruction word machine; and during the compiling, determining power configurations for the very long instruction word machine to execute the instructions, and populating fields of the instructions with the power configurations.

In some aspects, the techniques described herein relate to a method, wherein the power configurations direct the very long instruction word machine to adjust a power setting of the very long instruction word machine while executing the instructions.

In some aspects, the techniques described herein relate to a method, wherein each of the instructions includes operation fields populated with operations for execution by execution units of the very long instruction word machine and at least one power configuration field populated with the power configurations.

In some aspects, the techniques described herein relate to a method, wherein the execution units of the very long instruction word machine are configured to concurrently execute the operations of each respective instruction.

In some aspects, the techniques described herein relate to a method, wherein the power configurations each include an estimated amount of power used by the very long instruction word machine to execute one or more of the instructions.

In some aspects, the techniques described herein relate to a method, wherein the power configurations are determined based on operations in the instructions that describe operations for execution by execution units of the very long instruction word machine and power information that identifies energy consumed by the execution units of the very long instruction word machine.

In some aspects, the techniques described herein relate to a method, wherein the determining the power configurations includes determining at least a first power configuration for the very long instruction word machine to execute a first instruction and a second power configuration for the very long instruction word machine to execute a second instruction.

In some aspects, the techniques described herein relate to a method, wherein the populating includes populating a first field of the first instruction with the first power configuration and populating a second field of the second instruction with the second power configuration.

In some aspects, the techniques described herein relate to a method, further including during the compiling, determining that at least one execution unit is not used for executing a subset of the instructions, and populating one or more fields of the subset of the instructions with a power configuration that directs a power controller of the very long instruction word machine to disable the at least one execution unit during execution of the subset of the instructions.

In some aspects, the techniques described herein relate to a system including: a very long instruction word machine; and a compiler to compile a program to generate instructions for execution by the very long instruction word machine, the instructions including power configurations for the very long instruction word machine.

In some aspects, the techniques described herein relate to a system, wherein the very long instruction word machine includes: a power controller to adjust a power setting of the very long instruction word machine based on the power configurations included in the instructions; and execution units to execute the instructions.

In some aspects, the techniques described herein relate to a system, wherein the compiler generates the instructions by populating the power configurations into fields of the instructions.

In some aspects, the techniques described herein relate to a system, wherein the very long instruction word machine further includes one or more monitors to collect power information for the very long instruction word machine, and wherein the compiler determines the power configurations for the very long instruction word machine based at least in part on the power information collected by the one or more monitors.

In some aspects, the techniques described herein relate to a method including: obtaining, by a very long instruction word machine, an instruction that includes a power configuration for the very long instruction word machine and operations for execution by the very long instruction word machine; adjusting a power setting of the very long instruction word machine based on the power configuration of the instruction; and executing the operations of the instruction by the very long instruction word machine.

In some aspects, the techniques described herein relate to a method, wherein the instruction includes multiple fields, the multiple fields including operation fields populated with the operations for execution by the very long instruction word machine and a power configuration field populated with the power configuration.

In some aspects, the techniques described herein relate to a method, wherein the power configuration is determined and populated into the power configuration field of the instruction by a compiler.

In some aspects, the techniques described herein relate to a method, wherein the adjusting the power setting includes at least one of: disabling at least one execution unit of the very long instruction word machine or disabling hardware storage based on a determination that the operations of the instruction do not use the hardware storage.

In some aspects, the techniques described herein relate to a method, wherein the adjusting the power setting comprises concurrently adjusting a voltage and a frequency of the very long instruction word machine.

In some aspects, the techniques described herein relate to a method, wherein the adjusting the power setting includes increasing or decreasing a voltage of the very long instruction word machine.

In some aspects, the techniques described herein relate to a method, wherein the adjusting the power setting includes increasing or decreasing a frequency of the very long instruction word machine.

FIG. 1 is a block diagram of a non-limiting example system 100 having a compiler and a very long instruction word (VLIW) machine according to some implementations. In particular, the system 100 includes compiler 102 and VLIW machine 104, which includes an instruction controller 106, execution units 108, and a power controller 110.

In accordance with the described techniques, the compiler 102 obtains a program 112 and compiles the program 112 to generate instructions 114 for the VLIW machine 104. In contrast to conventional approaches, which generate instructions by simply populating operation fields with operations to be executed by a VLIW machine 104, the compiler 102 generates the instructions 114 to include both operations 116 and power configurations 118. It is to be appreciated that in some implementations, one or more fields of the instructions 114 specify control signals—in addition to fields populated with operations and the power configurations 118. For example, those fields specify one or more of control signals for various hardware blocks, latches, or flip flops, to name just a few. Alternatively or additionally, one or more of the fields are used to address registers, and so on.

The power configurations 118 direct the VLIW machine 104 to adjust the power utilized by the VLIW machine 104 while executing the instructions 114. In one example, the power configuration 118 is an estimated amount of power that will be used by the VLIW machine 104 to execute an instruction 114 or block of instructions 114. In this example, the power configuration 118 directs the VLIW machine 104 to adjust a power setting or power state of VLIW machine 104 based on the estimated amount of power needed to execute the instruction 114. In another example, the power configuration 118 directs the VLIW machine 104 to disable or enable one or more components of the VLIW machine 104 in order to adjust the power utilized by the VLIW machine 104. For example, the power configuration 118 directs the VLIW machine 104 to disable or enable one or more of the execution units 108. Alternatively or additionally, the power configuration 118 directs the VLIW machine to disable or enable hardware storage, e.g., in scenarios where the compiler 102 determines that the instructions 114 do not use such hardware storage. For instance, responsive to a determination that a register file or certain register file banks will not be accessed for one or more of the instructions 114, the power configuration 118 directs the VLIW machine 104 to disable the register file or certain register file banks during execution of respective instructions 114.

In one or more implementations, the compiler 102 determines the power configurations 118 based on power information 120. The power information 120 describes an estimated amount of energy consumed by components of the VLIW machine 104, e.g., to execute instructions. For example, in some variations, the compiler 102 obtains the power information 120 from one or more monitors of the VLIW machine 104 that collect information about energy consumed by the VLIW machine 104 while it executes instructions. In scenarios where such monitors collect information about the energy consumed while the VLIW machine 104 operates, the power information 120 obtained by the compiler 102 is referred to as "dynamic." An example of monitors includes performance counters that track block activity, power, and thermal activity of the VLIW machine 104 during operation. In one or more implementations, this includes block activity, power, and thermal activity of the execution units 108.

In another example, the compiler 102 obtains the power information 120 from a "static" source, such as a table or database that specifies amounts of energy consumed by the VLIW machine 104 while it executes instructions. The static source identifies amounts of energy consumed by components of the VLIW machine 104 (e.g., the execution units 108) in connection with executing particular operations (e.g., multiplication operations versus addition operations). By way of example, static sources of the power information 120 are created by a manufacturer (of the VLIW machine 104) and are deployed along with the compiler 102 and the VLIW machine 104, so that the compiler 102 has access to such a static source while compiling programs.

As part of compiling the program 112, the compiler 102 determines power configurations 118 for the instructions 114. In one or more implementations, the compiler 102 determines the power configurations 118 based on the power information 120 and also based on the operations 116 which are populated into the fields of the instructions 114. For example, the compiler 102 determines, based on the power information 120, an estimate of how much energy the VLIW machine 104 uses to execute particular combinations of the operations 116 which the compiler 102 has populated in the fields of the instructions 114, e.g., during a previous pass of the compiler 102 as part of compiling the program 112. For example, in some variations, the compiler 102 determines the estimate of power consumption by the VLIW machine 104 for each individual instruction of the instructions 114. In another example, the compiler 102 determines the estimate of power consumption for blocks of the instructions 114.

After determining the power configurations 118 for an instruction 114 or block of instructions, the compiler 102 inserts the power configuration 118 into at least one of the instructions. For example, if the power configuration 118 is determined for an individual instruction 114, then the compiler inserts the power configuration 118 into the individual instruction 114 itself. In another example, if the power configuration 118 is determined for a block of instructions 114, then the compiler 102 inserts the power configuration 118 into at least one of the instructions 114 in the block of instructions 114, e.g., the initial instruction 114 in the block of instructions 114.

In accordance with the described techniques, the instructions 114 include multiple fields which are populated by the compiler 102 when compiling program 112. The fields of each instruction include operation fields which the compiler populates with the operations 116 as well as a power configuration field which the compiler populates with the power configuration 118. Notably, conventionally configured compilers are limited to compiling instructions for VLIW machines by populating fields of those instructions with operations, but those compilers do not populate fields of instructions for VLIW machines with a power configuration. Thus, conventional VLIW instructions are unable to manage the power consumption of the VLIW machine by directing the VLIW machine to dynamically vary the power settings while executing the instructions.

In one or more implementations, the compiler 102 inserts the power configuration 118 into power configuration fields of the instructions 114 at intervals of time. For example, in some variations, the compiler 102 inserts the power configuration 118 into the power configuration fields at intervals which are based on a transition latency of the power controller 110. By way of example, if the power controller 110 has a 10,000-cycle transition latency, the compiler 102 determines the power configuration 118 for the instructions 114 at a 10,000-cycle granularity and populates the power configuration fields of the instructions 114 every 10,000 cycles.

In another example, the compiler 102 inserts the power configuration 118 into power configuration fields of the instructions 114 based on identifying that a change of the estimated energy used by the VLIW machine 104 to execute particular combinations of the operations 116 satisfies a threshold. For example, when the compiler 102 estimates that the energy used by the VLIW machine 104 to execute a particular combination of the operations 116 drops by a threshold amount relative to an estimate for preceding operations, the compiler 102 populates a power configuration field of the instructions 114 to include a power configuration 118 directing the power controller 110 to lower the power used by the VLIW machine 104. The compiler 102 inserts the power configuration 118 into a field of an instruction 114 in advance of instructions 114 populated with the operations 116 which correspond to the estimated drop. Similarly, when the compiler 102 estimates that the energy used by the VLIW machine 104 to execute a particular combination of the operations 116 increases by a threshold amount relative to an estimate for preceding operations, the compiler 102 populates a power configuration field of the instructions 114 to include a power configuration 118 directing the power controller 110 to increase the power used by the VLIW machine 104. The compiler 102 inserts this power configuration 118 into a field of an instruction 114 in advance of instructions 114 populated with the operations 116 which correspond to the estimated increase.

In one or more implementations, the compiler 102 inserts a power configuration 118 into the instructions 114 in order to direct the power controller 110 to disable one or more execution units 108 in order to reduce power. The power controller 110 disables the execution unit 108, for example, by clock or power gating the unit. For example, the compiler 102 determines that at least one execution unit 108 is not used for executing a subset of the instructions 114. The compiler 102 then causes the at least one execution unit 108 to be disabled during execution of the subset of instructions 114 by populating a field of the instructions 114 with a power configuration 118 that directs the power controller 110 to disable the unit. In some cases, the compiler disables the execution unit 108 if the number of consecutive instructions which do not utilize an execution unit 108 is greater than a threshold. As an example, if the number of consecutive instructions 114 which do not utilize a particular execution unit 108 is greater than 10, then the execution unit 108 is disabled. In contrast, if the number of instructions 114 which do not utilize the execution unit 108 is less than 10 (e.g., 5 consecutive instructions 114), then the execution unit 108 is not disabled. Of course, the threshold number may vary without departing from the spirit or scope of the described techniques.

To "re-enable" a disabled execution unit 108, the compiler 102 populates one or more fields of the instructions 114 with power configurations 118 that direct the power controller 110 to enable the disabled execution unit 108. The compiler 102 inserts the power configuration 118 into instructions 114 occurring in advance of instructions 114 which include operations 116 corresponding to a next usage of a disabled execution unit. By dynamically disabling and enabling execution units, the compiler 102 more precisely and more accurately controls an amount of power used by the VLIW machine 104 to execute instructions than conventional approaches.

In one or more implementations, the power configuration 118 identifies, to the power controller 110, the estimated power that is to be used by the VLIW machine 104 to carry out the respective operations 116 included in the instructions 114. Further, the power configuration 118 directs the power controller 110 to control the power used by the execution units 108 to execute the operations 116 included in the instructions 114. Based on the power configuration 118, the power controller 110 adjusts a power setting 122 of the VLIW machine 104. In one or more implementations, the power controller 110 adjusts the power setting 122 prior to executing at least one of the instructions 114.

By way of example, the power controller 110 adjusts one or more of voltage or frequency used by the execution units 108 to execute the operations 116 included in the instructions 114. In one or more scenarios, for instance, the power controller 110 adjusts the voltage and the frequency used by the VLIW machine 104 (or its components) concurrently. Alternatively or in addition, the power controller 110 adjusts the voltage and the frequency used by the VLIW machine 104 (or its components) separately, e.g., by adjusting one without adjusting the other or adjusting them at different times. In one or more implementations, the power controller 110 is a dynamic voltage and frequency scaling (DVFS) controller that dynamically scales at least one of the voltage or frequency used by the execution units 108 (or other components of the VLIW machine 104) according to the power configuration 118. In accordance with the described techniques, the power controller 110 includes logic for at least one of clock or power gating the execution units 108, muxes, latches, or other blocks of the VLIW machine 104. It is to be appreciated that the power controller 110 is configured to adjust the power setting 122 to affect various components and is not limited to adjusting the power setting 122 to adjust power settings solely for the execution units 108. In one or more implementations, for example, the power controller 110 additionally or alternatively adjusts the power setting 122 (including disabling or enabling) of register files, cache storage, and so on.

Based on execution of the instructions 114, the execution units 108 generate VLIW machine output 124. Examples of the VLIW machine output 124 include, but are not limited to, performed machine learning operations, performed cryptography operations, and processed digital signals, to name just a few.

Figure 2:
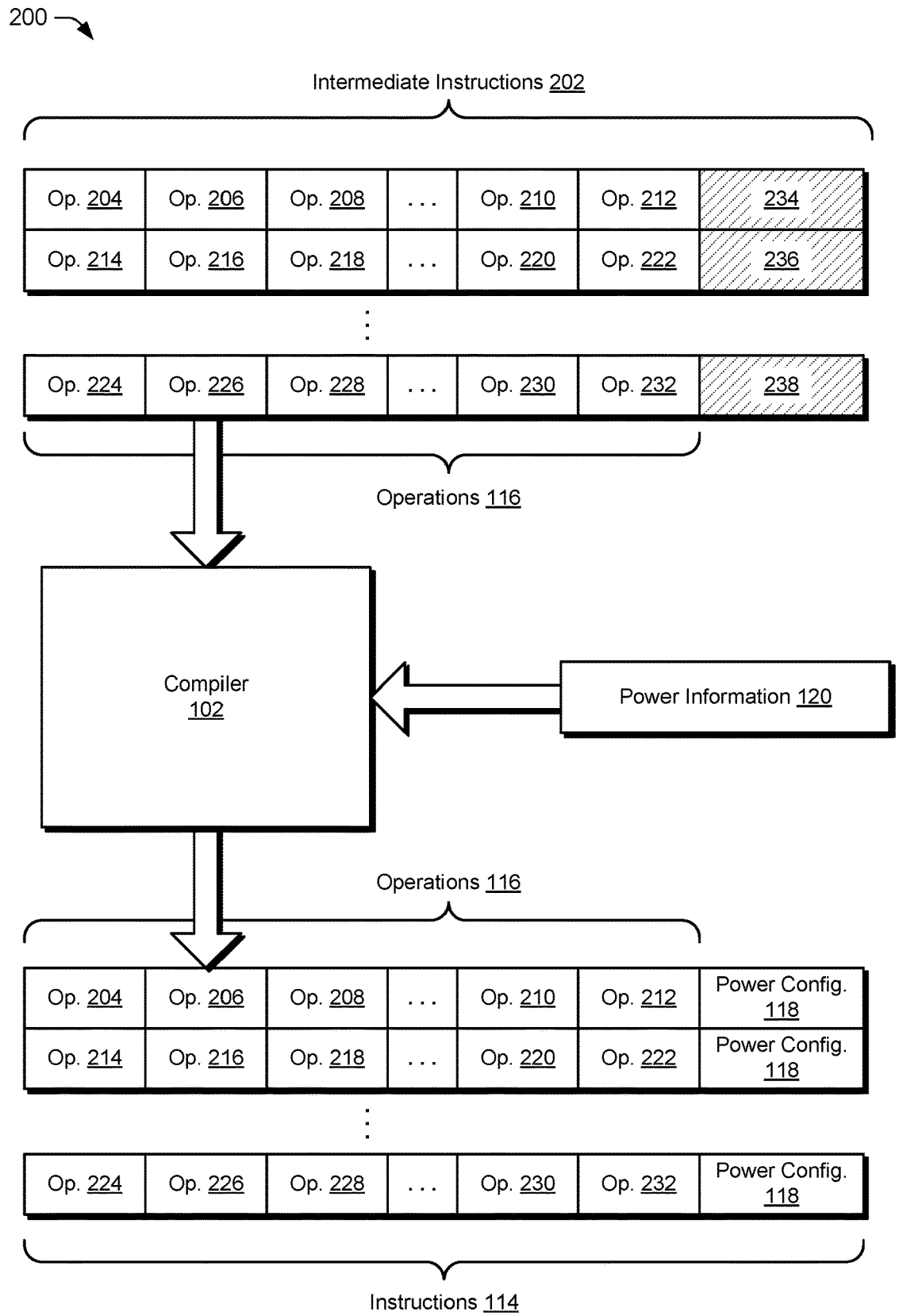
FIG. 2 depicts a non-limiting example in which a compiler inserts power configurations into fields of instructions while compiling a program.

FIG. 2 depicts a non-limiting example 200 in which a compiler inserts power configurations into fields of instructions while compiling a program. Example 200 includes from FIG. 1 the compiler 102, the instructions 114, and the power information 120. The illustrated example 200 also includes intermediate instructions 202, which the compiler 102 generates in at least one example prior to a pass in which the compiler 102 inserts the power configurations 118 into fields of the instructions 114. As described throughout, the compiler generates the instructions 114, which include both the operations 116 and the power configuration 118, based on the power information 120 and the particular operations 116 included in the instructions 114.

In example 200, the compiler 102 populates fields of a first of the intermediate instructions 202 with operations 204, 206, 208, 210, 212, fields of a second of the intermediate instructions 202 with operations 214, 216, 218, 220, 222, and fields of a last of the intermediate instructions 202 with operations 224, 226, 228, 230, 232. It is to be appreciated that the compiler 102 generates instructions with varying numbers of fields, where the number of fields of a given instruction is based on a configuration of the VLIW machine 104, and which differs from the depicted example, without departing from the spirit or scope of the techniques discussed herein. The complier 102 is also configured to generate varying numbers of instructions based on a particular program being compiled, and which also differs from the depicted example, without departing from the spirit or scope of the techniques discussed herein.

In addition to including fields for operations, the first, second, and last intermediate instructions 202 also include respective power configuration fields 234, 236, 238. Prior to the pass in which the compiler 102 populates those fields with the respective power configurations 118, the power configuration fields 234, 236, 238 do not specify an operation for execution by the execution units 108 or a power configuration that is specific to the operations of the respective instruction. For example, prior to the pass in which the compiler 102 populates the power configuration field 234 with the respective power configuration 118, the power configuration field 234 does not specify a power configuration that is specific to the operations 204, 206, 208, 210, 212. In one or more implementations, for instance, the fields 234, 236, 238 are instead set, prior to the pass that inserts the power configuration 118, to a default value (e.g., a default power configuration for the VLIW machine 104) or a value the power controller 110 is configured to ignore (e.g., NULL).

The compiler 102 populates the power configuration fields with the respective power configuration 118 based on the combination of operations 116 included in the respective instruction and the power information 120. Based on the power information 120, for example, the compiler 102 determines the respective power configuration 118 for the first instruction of the intermediate instructions 202 based on the combination of operations 204, 206, 208, 210, 212. Based on the power information 120, the compiler 102 further determines the respective power configuration 118 for the second instruction of the intermediate instructions 202 based on the combination of operations 214, 216, 218, 220, 222 and determines the respective power configuration 118 for the last instruction of the intermediate instructions 202 based on the combination of the operations 224, 226, 228, 230, 232. Thus, the compiler 102 determines the power configuration 118 on a per-instruction basis in one or more implementations. Based on those determinations, the compiler 102 then populates the power configuration fields 234, 236, 238 with the respective power configuration 118 and outputs the instructions 114 having the respective power configuration 118. Rather than including a default or "empty" value in the power configuration field 234, therefore, the first instruction of the instructions 114 includes a respective power configuration 118 which corresponds to an estimated amount of power the VLIW machine 104 will use to execute the operations 204, 206, 206, 208, 210, 212. Similarly, the second instruction of the instructions 114 includes a respective power configuration 118 which corresponds to an estimated amount of power the VLIW machine 104 will use to execute the operations 214, 216, 218, 220, 222, and so on.

Figure 3:
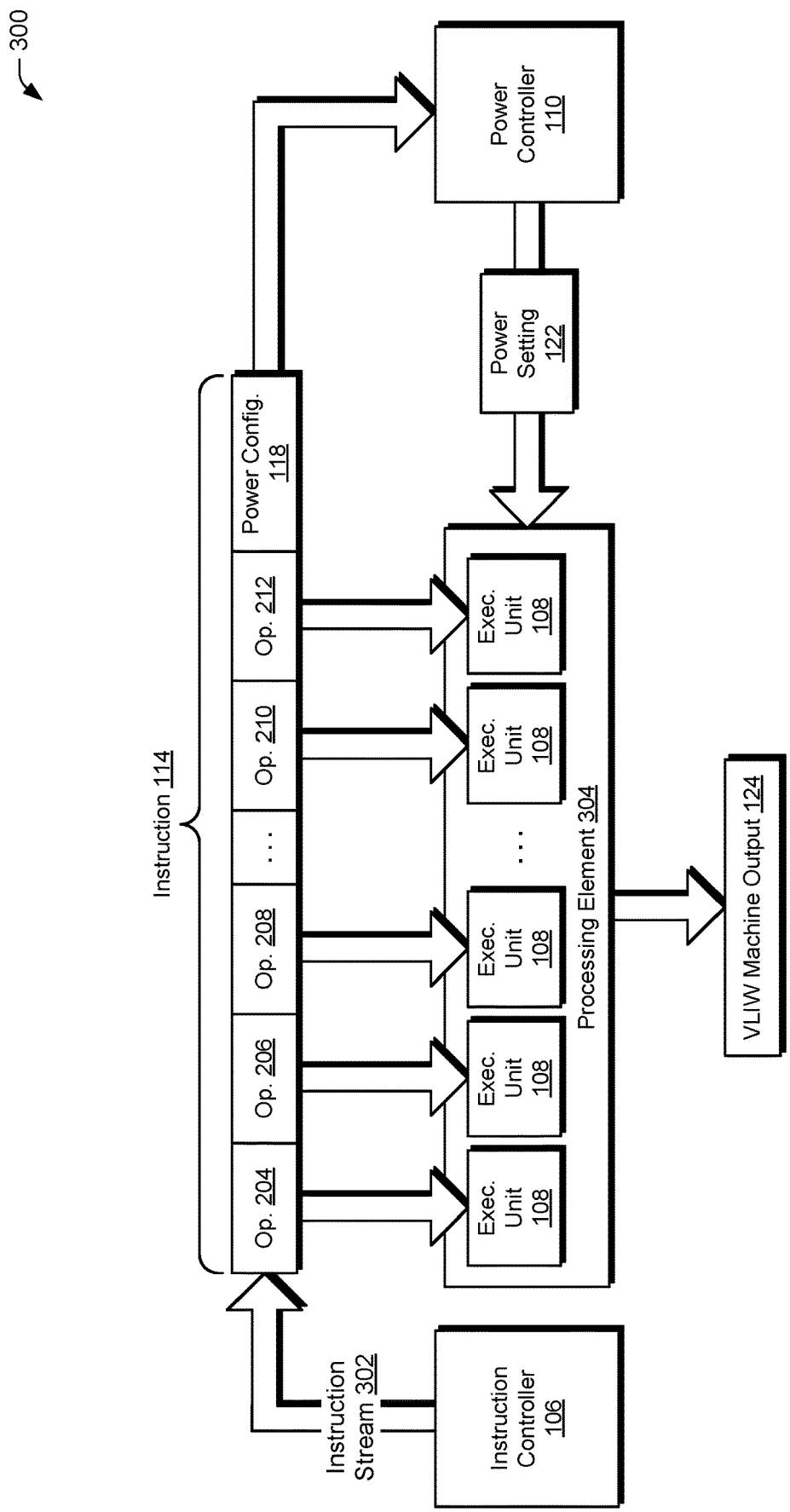
FIG. 3 depicts a non-limiting example in which a VLIW machine executes an instruction using a power setting adjusted according to a power configuration included in the instruction.

FIG. 3 depicts a non-limiting example 300 in which a VLIW machine executes an instruction using a power setting adjusted according to a power configuration included in the instruction. The example 300 includes from FIG. 1 the instruction controller 106, the execution units 108, and the power controller 110 of the VLIW machine 104. Here, the instruction controller 106 is depicted feeding an instruction stream 302 to the execution units 108 and the power controller 110 for execution of instructions and power management, respectively. In this example 300, the instruction stream 302 includes one of the instructions 114. In particular, this example 300 depicts the instruction stream 302 including the first instruction of the instructions 114 depicted in FIG. 2, which includes the operations 204, 206, 208, 210, 212. Further, the example 300 depicts the instruction 114 being provided to the execution units 108 and the power controller 110.

In accordance with the described techniques, the power controller 110 adjusts the power setting 122 of the VLIW machine 104 prior to execution of the instruction 114. In one or more implementations, the power controller 110 adjusts the power setting 122 to control power used by the execution units 108 in executing the operations of the instructions 114. Examples of how the power controller 110 adjusts the power setting 122 for execution units 108 or other components of the VLIW machine 104 are discussed in more detail above. In one or more implementations, the power controller 110 adjusts the power setting 122 for at least one processing element 304 which includes a set of the execution units 108. It is to be appreciated that in at least one example, the VLIW machine 104 includes a plurality of processing elements 304 with respective sets of execution units 108. With such configurations, the execution units 108 of the different processing elements 304 execute operations of multiple instructions 114 concurrently. In accordance with the described techniques, the power controller 110 adjusts power settings 122 for the different processing elements 304 in those configurations. In this way, the execution units 108 of those processing elements 304 execute respective operations of the instructions using power that has been adjusted by the power controller 110.

The illustrated example 300 also depicts the operations (e.g., operations 204-212) being fed to respective execution units 108. In accordance with the described techniques, the execution units 108 execute those operations of the instruction 114 concurrently. For instance, the execution units 108 of the VLIW machine 104 execute the operations 204, 206, 208, 210, 212 concurrently. Moreover, the execution units 108 execute the operations 204, 206, 208, 210, 212 concurrently using the power setting 122 adjusted by the power controller 110, which it adjusts according to the power configuration 118 of the instruction 114. The power controller 110 adjusts the power setting 122 prior to the execution units 108 executing those operations. Responsive to executing the instructions 114, the VLIW machine 104 generates the VLIW machine output 124, e.g., machine learning operations, cryptography operations, or processed digital signals, to name just a few.

This section describes examples of procedures for VLIW power management. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 4:
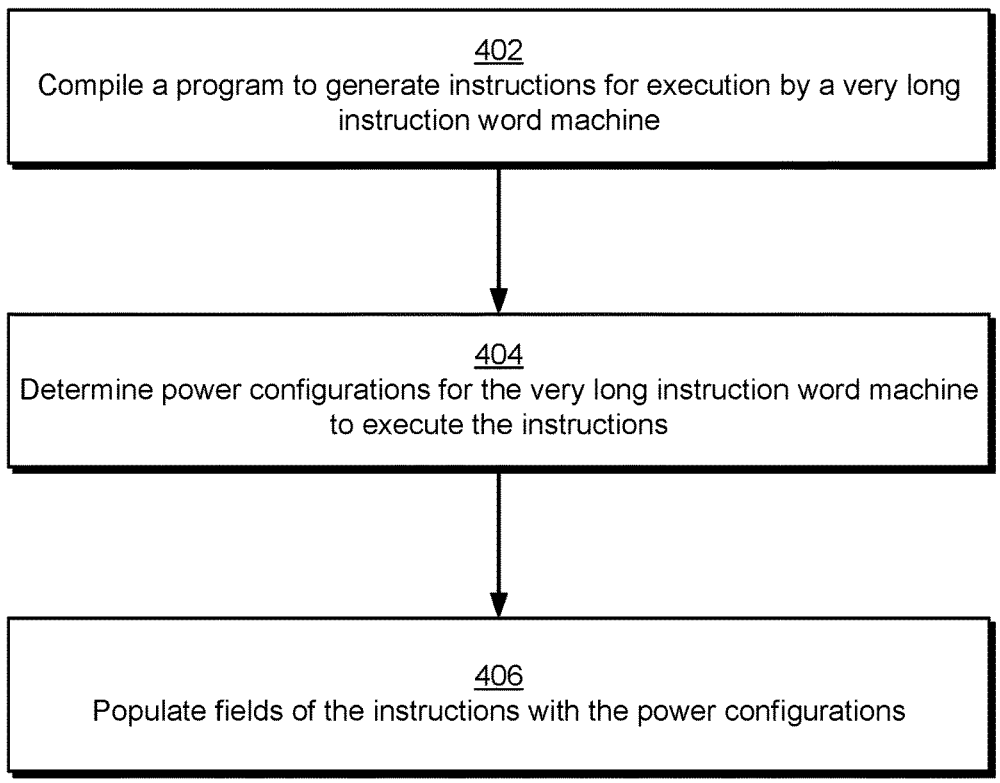
FIG. 4 depicts a procedure in an example implementation of compiling a program to generate instructions for a VLIW machine which include power configurations for the very long instruction word machine.

FIG. 4 depicts a procedure 400 in an example implementation of compiling a program to generate instructions for a very long instruction word machine which include power configurations for the very long instruction word machine.

A program is compiled to generate instruction for execution by a very long instruction word machine (block 402). By way of example, compiler 102 compiles program 112 to generate instructions 114 for execution by VLIW machine 104.

A power configuration for the very long instruction word machine to execute the instructions is determined (block 404). In one or more implementations, the power configurations are determined during the compiling of the program. By way of example, compiler 102 determines power configurations 118 for the VLIW machine 104 while compiling the program 112 to generate instructions 114 for the VLIW machine 104.

In one or more implementations, the compiler 102 determines the power configurations 118 for the instructions 114 based on the power information 120 and also based on the operations 116 with which fields of the instructions 114 are populated. The power information 120 describes an estimated amount of energy consumed by components of the VLIW machine 104, e.g., to execute instructions. The compiler 102 determines, based on the power information 120, an estimate of how much energy the VLIW machine 104 uses to execute particular combinations of the operations 116 which the compiler 102 has populated in the fields of the instructions 114, e.g., during a previous pass. In one or more implementations, the compiler 102 is configured to determine the estimate for each instruction of the instructions 114. Alternatively or additionally, the compiler 102 is configured to determine the estimate for blocks of instructions of the instructions 114.

Fields of the instructions are populated with the power configurations (block 406). In one or more implementations, the fields of the instructions are populated with the power configurations during the compiling of the program. The compiler 102 populates the power configurations 118 into a field of a given instruction of the instructions 114 (e.g., a field of each instruction) or into one or more fields of a block of instructions of the instructions 114. By way of example, compiler 102 populates one or more of the power configuration fields 234, 236, and 238 of intermediate instructions 202 with the power configurations 118. The compiler 102 populates the power configuration fields with the respective power configuration 118 based on the combination of operations 116 included in the respective instruction and the power information 120.

Figure 5:
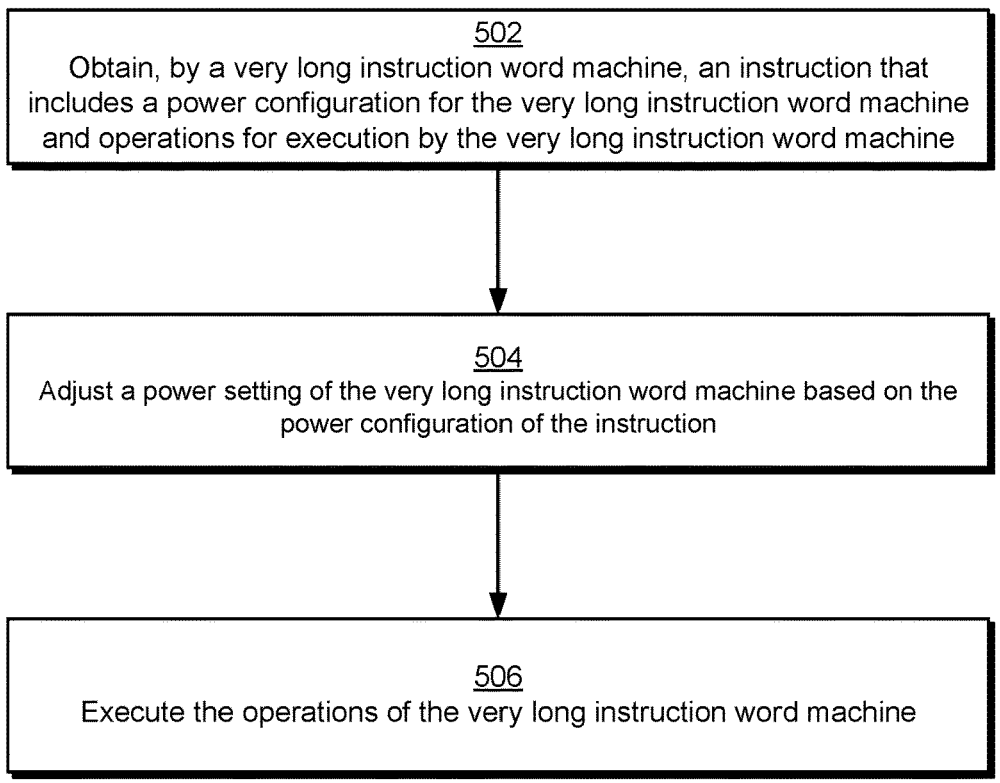
FIG. 5 depicts a procedure in an example implementation of adjusting a power setting of a VLIW machine based on a power configuration of an instruction for the very long instruction word machine.

FIG. 5 depicts a procedure 500 in an example implementation of adjusting a power setting of a very long instruction word machine based on a power configuration of an instruction for the very long instruction word machine.

An instruction that includes a power configuration for a very long instruction word machine and operations for execution by the very long instruction word machine is obtained by the very long instruction word machine (block 502). By way of example, power controller 110 of VLIW machine 104 obtains an instruction 114 which includes a power configuration 118 for the VLIW machine 104 and operations 116 for execution by the VLIW machine 104. In one or more implementations, the power configuration 118 is populated into a field of the instruction 114 by the compiler 102, e.g., as part of compiling program 112.

A power setting of the very long instruction word machine is adjusted based on the power configuration of the instruction (block 504). By way of example, power controller 110 adjusts a power setting 122 of the VLIW machine 104 based on the power configuration 118 of the instruction 114. In one or more implementations, the power controller 110 adjusts one or more of voltage or frequency used by the execution units 108 to execute the operations 116 included in the instructions 114.

The operations of the instruction are executed by the very long instruction word machine (block 506). By way of example, execution units 108 of the VLIW machine 104 execute the operations 116 of the instructions 114.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the compiler 102, the VLIW machine 104, the instruction controller 106, the execution units 108, and the power controller 110) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Conclusion

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
obtaining power information for a very long instruction word machine;
compiling a program to generate instructions for execution by the very long instruction word machine; and
during the compiling, determining power configurations for the very long instruction word machine to execute the instructions based at least in part on the power information for the very long instruction word machine, and populating fields of the instructions with the power configurations.

2. The method of claim 1, wherein the power configurations direct the very long instruction word machine to adjust a power setting of the very long instruction word machine while executing the instructions.

3. The method of claim 1, wherein each of the instructions includes operation fields populated with operations for execution by execution units of the very long instruction word machine and at least one power configuration field populated with the power configurations.

4. The method of claim 3, wherein the execution units of the very long instruction word machine are configured to concurrently execute the operations of each respective instruction.

5. The method of claim 1, wherein the power configurations each comprise an estimated amount of power used by the very long instruction word machine to execute one or more of the instructions.

6. The method of claim 1, wherein the power configurations are determined based on operations in the instructions that describe operations for execution by execution units of the very long instruction word machine and the power information, wherein the power information identifies energy consumed by the execution units of the very long instruction word machine.

7. The method of claim 1, wherein the determining the power configurations comprises determining at least a first power configuration for the very long instruction word machine to execute a first instruction and a second power configuration for the very long instruction word machine to execute a second instruction.

8. The method of claim 7, wherein the populating comprises populating a first field of the first instruction with the first power configuration and populating a second field of the second instruction with the second power configuration.

9. The method of claim 1, further comprising during the compiling, determining that at least one execution unit is not used for executing a subset of the instructions, and populating one or more fields of the subset of the instructions with a power configuration that directs a power controller of the very long instruction word machine to disable the at least one execution unit during execution of the subset of the instructions.

10. A system comprising:
a very long instruction word machine; and
one or more monitors to obtain power information for the very long instruction word machine; and
a compiler to determine power configurations for the very long instruction word machine based at least in part on the power information obtained from the one or more monitors of the very long instruction word machine, and compile a program to generate instructions for execution by the very long instruction word machine, the instructions including the power configurations for the very long instruction word machine.

11. The system of claim 10, wherein the very long instruction word machine includes:
a power controller to adjust a power setting of the very long instruction word machine based on the power configurations included in the instructions; and
execution units to execute the instructions.

12. The system of claim 11, wherein the compiler generates the instructions by populating the power configurations into fields of the instructions.

13. A method comprising:
obtaining, by a very long instruction word machine, an instruction that includes a power configuration for the very long instruction word machine and operations for execution by the very long instruction word machine, wherein the power configuration is determined by a compiler based at least in part on power information of the very long instruction word machine;
adjusting a power setting of the very long instruction word machine based on the power configuration of the instruction; and
executing the operations of the instruction by the very long instruction word machine.

14. The method of claim 13, wherein the instruction includes multiple fields, the multiple fields including operation fields populated with the operations for execution by the very long instruction word machine and a power configuration field populated with the power configuration.

15. The method of claim 14, wherein the power configuration is populated into the power configuration field of the instruction by a compiler.

16. The method of claim 13, wherein the adjusting the power setting comprises at least one of:
disabling at least one execution unit of the very long instruction word machine; or
disabling hardware storage based on a determination that the operations of the instruction do not use the hardware storage.

17. The method of claim 13, wherein the adjusting the power setting comprises concurrently adjusting a voltage and a frequency of the very long instruction word machine.

18. The method of claim 13, wherein the adjusting the power setting comprises increasing or decreasing a voltage of the very long instruction word machine.

19. The method of claim 13, wherein the adjusting the power setting comprises increasing or decreasing a frequency of the very long instruction word machine.

20. The method of claim 1, wherein the power information is obtained from one or more monitors of the very long instruction word machine.

* * * * *